United States Patent [19]
Hyrve

[11] 3,731,833
[45] May 8, 1973

[54] PLUG FOR BORE HOLES

[76] Inventor: Arnold Thomas Hyrve, 818 Manlewood Cresent, Calgary, Alberta, Canada

[22] Filed: Oct. 15, 1971

[21] Appl. No.: 189,718

[52] U.S. Cl. ............................................. 220/24.5
[51] Int. Cl. ............................................. B65d 39/12
[58] Field of Search ............... 220/24.5, 24, 42 B; 138/89

[56] References Cited

UNITED STATES PATENTS 2,403,386  7/1946  Lubelsky et al. ..................... 220/24.5
3,361,287  1/1968  Clemons et al. ...................... 220/24.5

Primary Examiner—George T. Hall
Attorney—John E. Prothroe

[57] ABSTRACT

A plug for shot holes employed in seismic exploration in the form of a spiral sheet metal member with the convolutions slightly overlapping and shaped to define a frustro-conical member positioned in the shot hole with the largest convolution disposed below the central convolution.

8 Claims, 4 Drawing Figures

Patented May 8, 1973

Arnold Hyrve

INVENTOR.

BY

Patented May 8, 1973   3,731,833

Arnold Hyrve
*INVENTOR.*

BY

PLUG FOR BORE HOLES

The present invention generally relates to a plug for shot holes employed in the seismic exploration industry.

In the seismic exploration industry shot holes are drilled to various depths and an explosive charge is lowered into the hole and detonated while seismic readings are taken. After the desired readings have been obtained, it is necessary to close the hole. In view of the depth of the holes, sometimes as deep as 100 feet, it is time consuming and laborious to completely fill the hole with dirt. Rather, it is conventional practice to plug the hole near its upper end by jamming a short length of log into the hole or inserting a "top hat" type of plug, having the general configuration of a top hat, several feet down the hole, and then pile dirt over the plug.

Such plugs all suffer from various disadvantages. The log plug will sometimes fail due to the log becoming loose and dropping down into the hole, thus leaving an open hole. This is especially a problem where most shot hole work is done in winter when the ground is frozen, with thawing of the ground causing the log to loosen. The "top hat" plug requires initial shovelling on the hole in order to provide a base for the rim of the "hat," which is time consuming when the ground is frozen.

The principle object of the present invention is to provide a plug for shot holes used in seismic exploration which may be readily inserted into the shot hole without any preliminary preparation of the hole and which will be permanently and securely retained in position in the hole. A further object of the present invention is to provide a permanent plug for shot holes used in seismic exploration in the form of a spirally wound sheet metal member that is inwardly compressed by engagement with the shot hole, for anchoring the plug in position so that dirt may be piled thereon in the hole.

Another object of the present invention is to provide a plug for a shot hole in the form of conical helix of sheet metal which is rotated into the shot hole with large bottom convolution thereof cutting a thread on the interior of the hole.

A further object of this invention is to provide a shot hole plug which is simple in construction, easy to install, dependable and long lasting.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
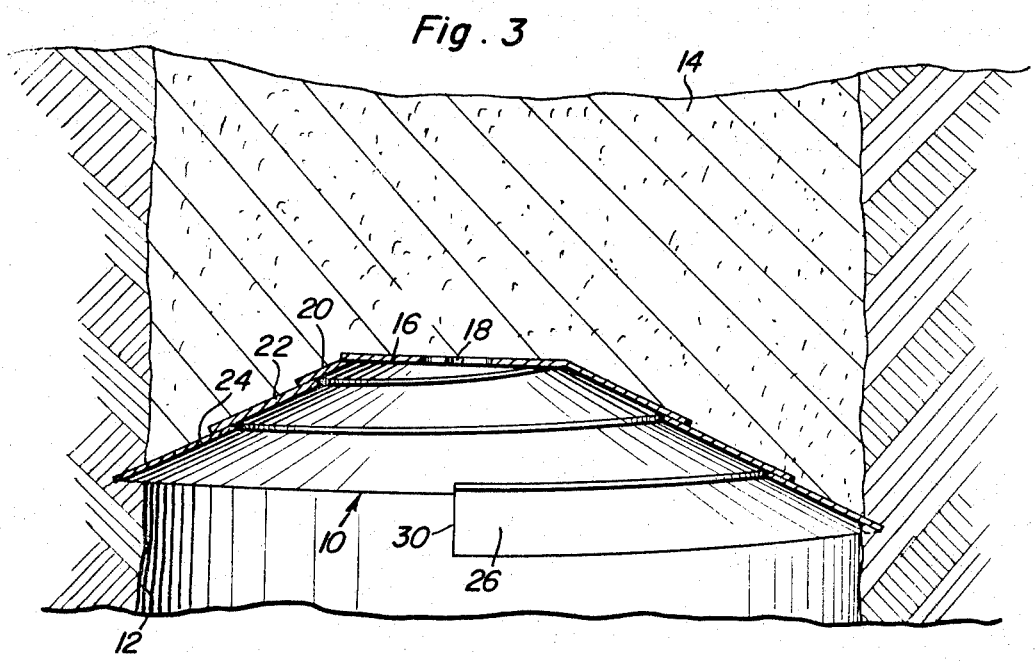
FIG. 3 is a sectional view of the plug installed in a shot hole.

Referring now specifically to the drawings, the plug of the present invention is generally designated by numeral 10 for positioning in a shot hole 12 as used in seismic exploration. As illustrated in FIG. 3, the plug 10 is disposed below the top of the shot hole 12 and 2 to 3 feet of dirt 14 is placed on top of the plug to fill the top of the hole.

The plug 10 is a conical helix or spiral of sheet metal including a central circular plate 16 having rotational slot means 18 therein. Extending from the plate 16 is a spiral helix having convolutions 20, 22, 24 and 26 oriented in inclined relation to form a conical dome with edges of the convolutions being slightly overlapped as at 28. The terminal end 28 of the largest and lowermost convolution 26 has a straight terminal edge 30 in the embodiment of the invention depicted in FIGS. 1 to 3.

As depicted in the cross-sectional view FIG. 3, the angle formed between the longitudinal axis of the spiral conical member and the angle of the plane of the strip material of any convolution thereof is slightly less than perpendicular, in order to define a conical member having a relatively flat cone angle at the projected apex.

A wrench type tool 32 is provided for engagement with the slot means 18 to enable the plug to be rotated into the hole 12. As the plug is rotated in a clockwise direction, as depicted in FIG. 2, the peripheral edge of the lowest convolution is threaded into the hole and the edge thereof comes into engagement with and cuts into the wall surface and is thereby supported so that the plug in turn will support a column of dirt of several feet in depth when placed in the hole on top of the plug.

The central plate 16 may of course vary in size and shape. The diameter of the convolutions of the spiral formed by the sheet metal strip are made increasingly smaller as the cone tapers towards its apex, so that the outer edge of a lower convolution will extend beyond the outer edge of an adjacent upper convolution, to define a frustro-conical member with the overlapping edges defining a spiral around the surface of the cone.

Figure 2:
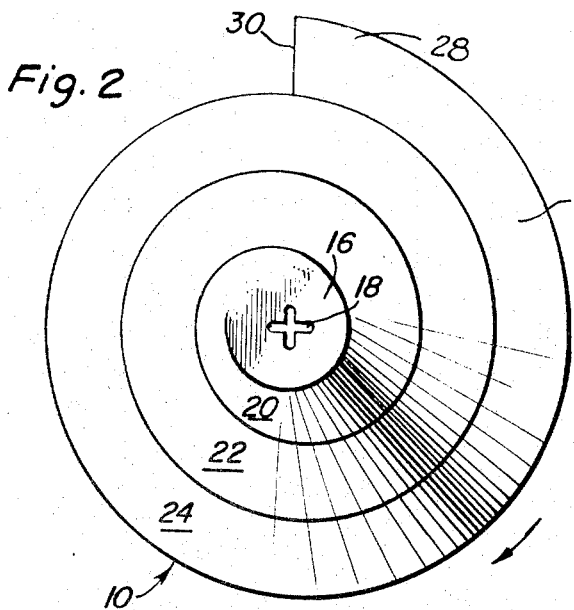
FIG. 2 is a top plan view of the plug.
Figure 1:
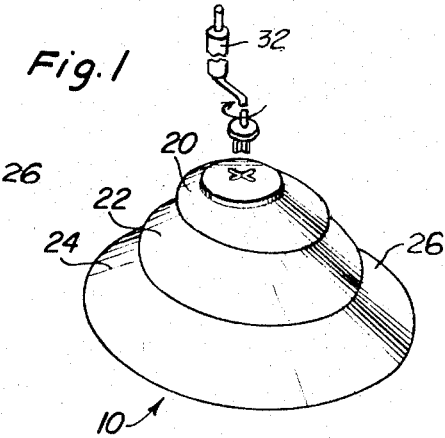
FIG. 1 is a perspective view of the plug and a tool for installation thereof.
Figure 4:
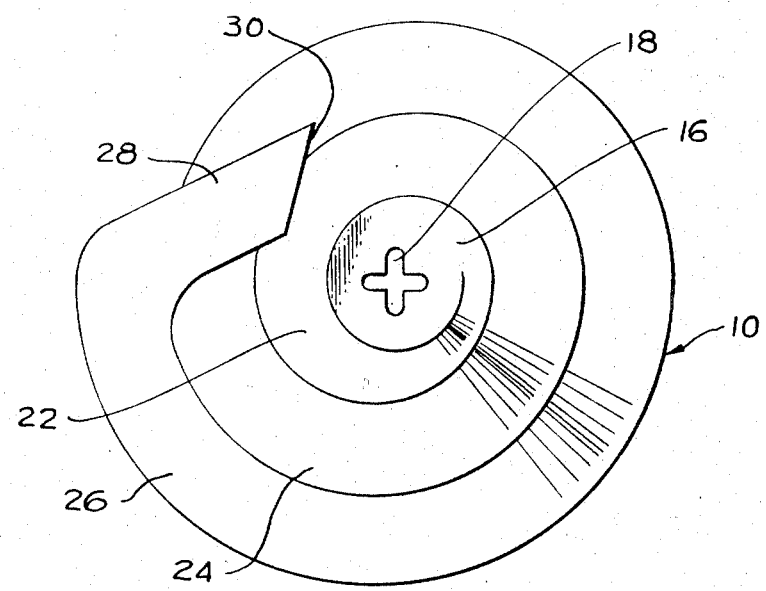
FIG. 4 is a bottom plan view of an alternative embodiment of the device of this invention, adapted to overcome any tendency of the lowermost convolution of the conical spiral to become displaced from its underlying position during insertion in a shot hole.
Figure 4:
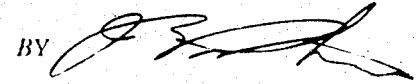

To overcome a possible defect in the embodiment of the invention depicted in FIGS. 1 to 3, a modification has been found to be effective, which is depicted in FIG. 4. It has been found that if severe downwards pressure is applied to the plug of FIGS. 1 to 3 during initial insertion thereof into a shot hole, the terminal end 28 of the lowermost convolution 26 will be transported radially outwardly until it becomes disengaged from the next adjacent convolution 24, resulting in a failure of the plugging operation.

In the embodiment of the invention depicted in FIG. 4, the terminal end of the lowermost convolution 26 is returned inwardly towards the longitudinal axis of the cone, a distance sufficient to continually engage and support the lowermost convolution 26 in its vertical relationship with the next adjacent convolution 24, in the event of any such radial outwardly displacement of the lowermost convolution 26. A returned length on the terminal end 28 of approximately one-quarter of the diameter of the plug has been found to be most suitable.

The plug is most readily and inexpensively formed from die-cut cold-rolled sheet steel of from 12 to 16 gauge, zinc galvanized for rust and corrosion protection. However, other relatively rigid materials having limited resilience are usable, such as other metals and plastic materials.

In use, the plug is selected for size so that in its uncompressed state it will be approximately 10 to 25 percent larger in diameter than the shot hole to be plugged, depending on the resilient flexibility of the material of the plug. The operator will insert the frustro-conical plug in the shot hole, with the frustum or smaller end uppermost, by hand-compressing inwardly radially the outermost convolution 26 of the plug. Release of the compressed convolution 26 within the shot hole brings the spiral outermost edge of the lower convolution into engagement with the walls 14 of the hole. The plug is then rotated clockwise as depicted in FIGS. 1 and 2, by means of the tool 32 thereby causing the plug to thread its way into the hole in screw-fashion for a preferred distance of several feet, depending on the consolidation of the ground encountered. Loose fill is then shovelled into the shot hole on top of the plug in place and subsequently tamped, the weight of the fill serving to force adjacent convolutions in closer mutual engagement and at the same time to expand each convolution radially outwardly so that the engagement of the lowermost convolution 26 and in some cases depending on the degree of compression, the next adjacent convolution 24, into the face of the shot hole walls, becomes more complete.

The foregoing is considered as illustrative only of the principles of the invention. Further, since numerous modifications and changes will readily occur to those skilled in the art, it is not desired to limit the invention to the exact construction and operation shown and described.

What I claim as my invention is:

1. A plug for seismic exploration shot holes comprising a generally elongated, relatively rigid, resiliently flexible strip formed into a frustro-conical helix and having a longitudinal axis and having a plurality of superposed convolutions, the outer edges of each upper adjacent convolution of said helix partially overlapping the inner edge of the next immediately adjacent lower convolution, and defining a centrally located opening defined by the inner edges of the uppermost of said convolutions, said helix terminating at its smaller and upper end in a generally circular closure plate overlying said centrally located opening at the frustum of said frustro-conical helix.

2. The structure as defined in claim 1 wherein said frustro-conical helix member is constructed with each of said convolutions having a major portion of its width exposed, the surface of said strip being inclined inwardly and upwardly towards the longitudinal axis of said helix.

3. The structure defined in claim 1 in which the lowermost of said convolutions is inwardly bent adjacent its distal end to form a generally radially disposed support portion adapted to bear against the lower edge of the next adjacent convolution and thereby restrain upwards displacement of said distal end of said lowermost convolution relative to said next adjacent convolution when said plug is being inserted into a shot hole.

4. A closure plug for seismic exploration shot holes comprising in combination:

a generally elongated, relatively rigid, resiliently flexible strip formed in an upwardly-ascending, inwardly-tapering helix, having a plurality of adjacently superposed overlapping convolutions, each of said convolutions of said strip defining a central substantially circular opening, the surface of said strip being inclined inwardly and upwardly towards the longitudinal axis of said helix;

a closure plate connected to said elongated strip adjacent the uppermost of said convolutions and overlying the central opening thereof; and means incorporated in said closure plate adapted to receive a rotating tool whereby said closure plug may be rotated in screw-fashion by the engagement of the spiral outer edge of the lowermost of said convolutions engaging the wall surface of the bore of a seismic shot hole.

5. The structures defined in claim 4 in which the lowermost of said convolutions is inwardly bent adjacent its distal end to form a generally radially disposed support portion adapted to bear against the lower edge of the next adjacent convolution and thereby restrain upwards displacement of said distal end of said lowermost convolution relative to said next adjacent convolution when said plug is being inserted into a shot hole.

6. For use in plugging a ground bore such as a shot hole used in seismic exploration, a generally frustro-conical helix member comprised of relatively rigid, resiliently flexible material in generally elongated strip form having the configuration of an upwardly and inwardly tapering frustum of a cone of multiple convolutions, the larger end of said conical member being disposed downwardly and being inwardly compressible and provided with a lower spiral edge for engagement with the wall of the bore, means on the upper end of said conical member for receiving a tool for rotating the conical member to facilitate installation thereof within the bore, the convolutions of the conical member being inclined in relation to the longitudinal axis thereof whereby rotation threads the conical member into the bore, and the outer edge of each upper adjacent convolution of the conical member partially overlapping the inner edge of the next immediately adjacent lower convolutions, thereby enabling radial expansion and contraction of the convolutions when said helix member is being threaded into the bore and forming a rigid support for a column of dirt placed in the bore on top of said helix member.

7. A closure plug for seismic exploration shot holes, of generally frustro-conical helix configuration and having a longitudinal axis, adapted to be introduced into the bore of a shot hole in screw-fashion with the larger diameter of said frustro-conical helix disposed downwardly within said bore hole, comprising in combination:

a generally elongated, relatively rigid, resiliently flexible strip formed into a continuous surface defined by the locus of a line which is:

i. spaced distantly from and inclined at an acute angle to said longitudinal axis of said closure plug;

ii. rotating about and simultaneously advancing along said longitudinal axis in upwardly ascending aspect at a diminishing radius;

a closure plate connected to said elongated strip adjacent the frustum end of said frustro-conical helix and adapted to close the central opening defined by said strip at said frustum end of said frustro-conical helix; and means incorporated in said closure plate adapted to receive a rotating tool whereby said closure plug may be rotated in screw-fashion by the engagement of the spiral outer edge of the lower-most of said convolutions engaging the wall surface of a bore of a seismic shot hole.

8. The structure defined in claim 7 in which the lower end of said elongated strip is inwardly bent to form a generally radially disposed support portion adapted to bear against the lower edge of the next adjacent convolution of said continuous strip and thereby restrain upwards displacement of said distal end of said lowermost convolution relating to said next adjacent convolution when said plug is being inserted into a shot hole.

* * * * *